United States Patent
Buss et al.

(10) Patent No.: US 6,247,299 B1
(45) Date of Patent: Jun. 19, 2001

(54) METHOD FOR FEEDING A GAS TURBINE WITH BOTH LIQUID AND GASEOUS FUELS

(75) Inventors: Johannes Buss, Ohlsbach (DE); Klaus Döbbeling, Windisch (CH); Dieter Winkler, Lauchringen (DE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 08/972,146

(22) Filed: Nov. 17, 1997

(30) Foreign Application Priority Data

Nov. 16, 1996 (DE) .............................. 196 47 492

(51) Int. Cl.[7] .................................. F02C 7/224
(52) U.S. Cl. ..................... 60/39.05; 60/39.463; 60/736
(58) Field of Search ................ 60/39.05, 39.06, 60/39.12, 39.463, 736, 743; 261/143, 144, DIG. 83

(56) References Cited

U.S. PATENT DOCUMENTS

| 2,792,058 | 5/1957 | Thomas et al. . |
| 3,691,762 | 9/1972 | Ryberg et al. . |
| 4,025,282 | * 5/1977 | Reed et al. .................. 60/39.463 |
| 4,262,482 | * 4/1981 | Roffe et al. .................. 60/39.463 |
| 4,838,029 | 6/1989 | Gleason et al. . |
| 5,344,306 | 9/1994 | Brown et al. . |

FOREIGN PATENT DOCUMENTS

| 3043698A1 | 6/1981 | (DE) . |
| 0019421A2 | 11/1980 | (EP) . |
| 0 582 427 | 2/1994 | (EP) . |
| 1566525 | 4/1980 | (GB) . |
| 2064006 | * 6/1981 | (GB) .................. 60/39.463 |

* cited by examiner

*Primary Examiner*—Louis J. Casaregola
(74) *Attorney, Agent, or Firm*—Burns, Doane, Swecker & Mathis, L.L.P.

(57) ABSTRACT

A description is given of a method for feeding liquid and/or gaseous fuels to gas turbines, by means of which method the same feed path to the burner of the gas turbine can be used for both fuels, the liquid fuel being processed before being fed to the burner. This processing takes place in a fuel pre-evaporator which, for the purpose of processing the liquid fuel, has an evaporator tube 2, which is made of a material with good thermal conductivity, interacts with a heating device (3) and, at its one end, is connected to a feed device (4) for a flushing gas, and, at its other end, is connected to a fuel feed and discharge appliance (5).

4 Claims, 2 Drawing Sheets

METHOD FOR FEEDING A GAS TURBINE WITH BOTH LIQUID AND GASEOUS FUELS

BACKGROUND OF THE INVENTION

1. Field of the Invention

The invention relates to a method for feeding a gas turbine with both liquid and gaseous fuels.

2. Discussion of Background

Conventional gas turbines, if they are operated with both liquid and gaseous fuels, have separate feed paths for each type of fuel. For the combustion of gaseous fuel, premix burners are generally used, in which gaseous fuel is mixed with the combustion air in premixing zones and is combusted. If liquid fuel is used, it is injected into the premixing zone through one or more nozzles.

However, mixing of the injected fuel with the combustion air is insufficient, in particular because it is not possible to keep the droplet size sufficiently small. Moreover, the use of two separate feed paths is technically very complicated, without as a result improving the performance of the gas turbine. It has not to date been possible to use both types of fuel in a single feed system, since there are very different impulse ratios at the gas inlet into the combustion chamber with the same amount of power supplied, owing to the different volumetric calorific values of liquid and gaseous fuels.

SUMMARY OF THE INVENTION

Accordingly, one object of the invention is to provide a novel method for producing identical volumetric calorific values with both gaseous and liquid types of fuel. A further object consists in providing an appliance for carrying out this method.

These objects are each achieved by the features of the defining portion of claim 1 and claim 5, respectively. Advantageous embodiments of the method and advantageous embodiments of such an appliance are described by the features of the dependent claims.

Such a method has the advantage, in particular, that a common feed path can be used for both types of fuel, with the result that the design is simplified very considerably and, above all, the performance of the gas turbine can be increased. A further advantage of the invention is that the liquid fuel can be evaporated at lower temperature, and hence the risk of carbon deposition (coking) is reduced. Also, the density of the fuel-flushing gas mixture can be adjusted so that the penetration depth of the fuel jets is essentially the same for both types of fuel, i.e. so that the same impulse ratios can be generated. This results in the same premixing performance for both types of fuel. Moreover, the $NO_x$ emissions can be reduced. In addition, there is no risk of drops of fuel condensing on the burner wall, because the burner then only contains gaseous fuel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
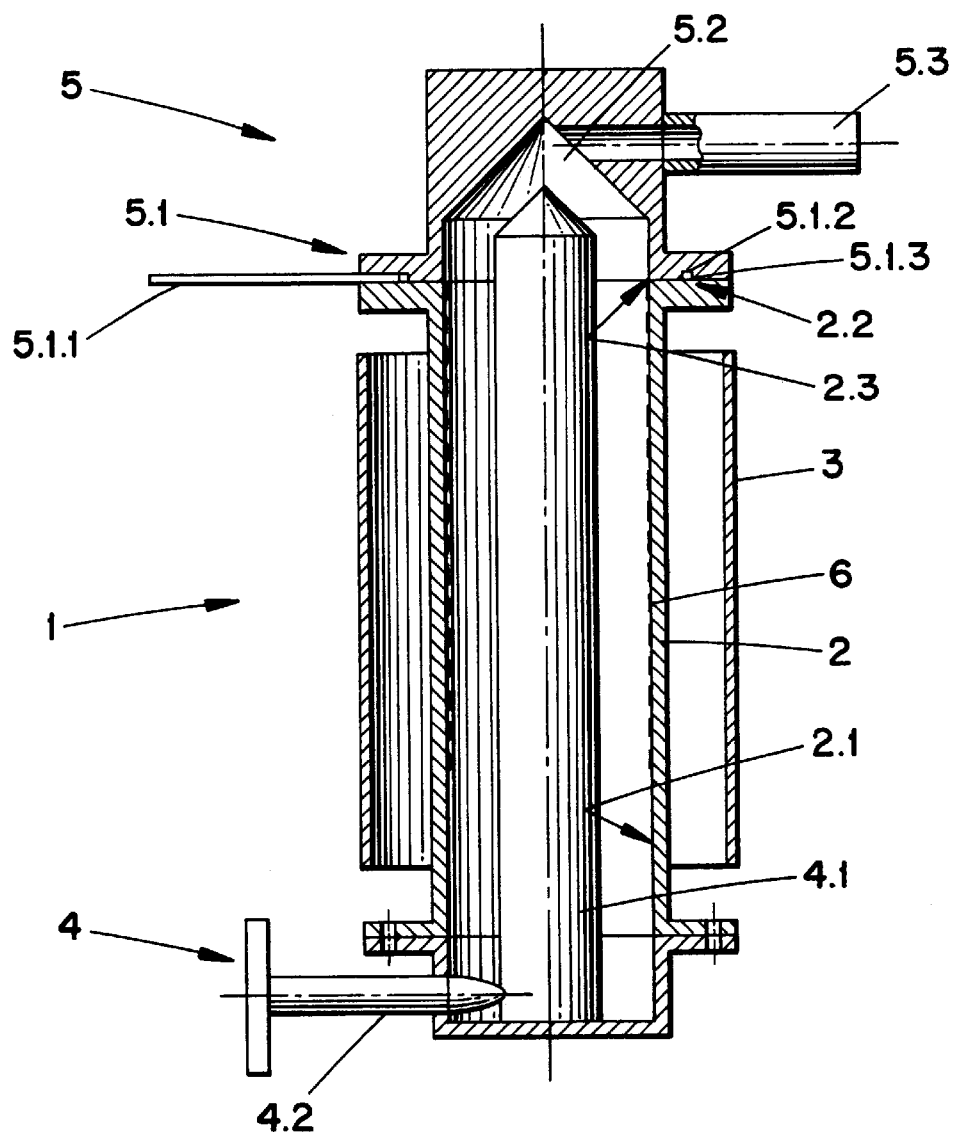
FIG. 1 shows a longitudinal section through a processing device.
Figure 2:
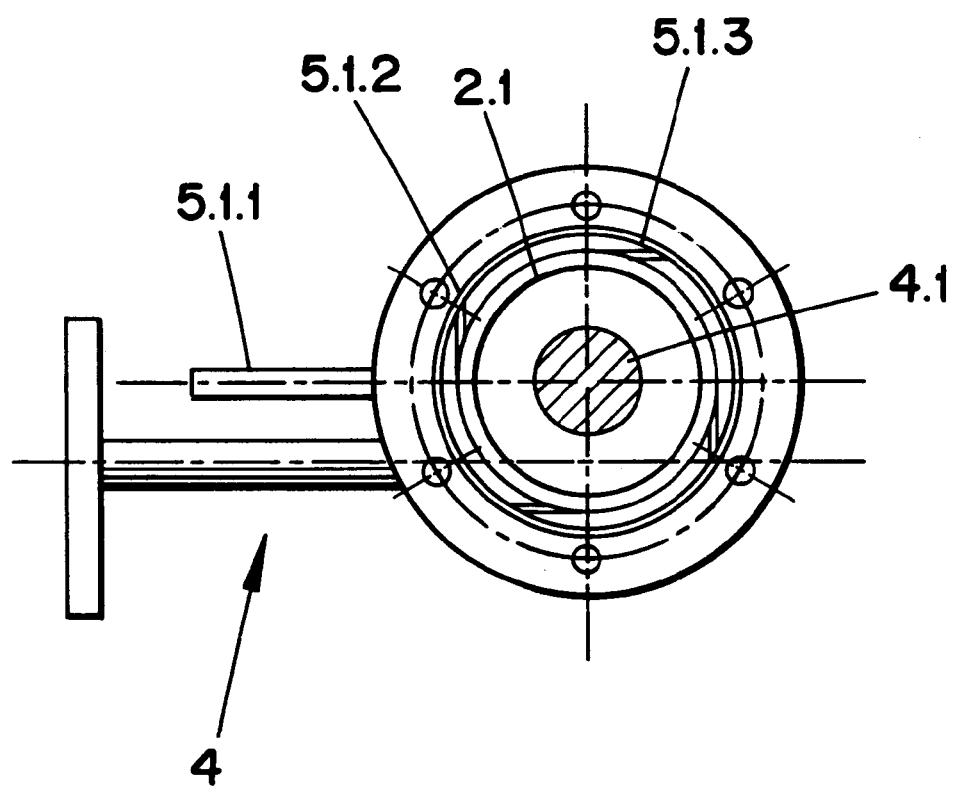
FIG. 2 shows a cross-section of a processing device.

Referring now to the drawings, wherein like reference numerals designate identical or corresponding parts throughout the several views, in a method for processing liquid fuels for use in a gas turbine which can also be operated with gaseous fuels, the liquid fuel is processed in a processing device with a gas, which may be steam which is branched off from the steam turbine circuit or an inert gas, for example $N_2$ or $CO_2$, to form a gas mixture, which can be fed to the burner via the same feed device as the gaseous fuel. This processing of the liquid fuel results in essentially the same volumetric calorific value and a corresponding density, by means of the type, quantity and temperature of the flushing gas, as for the gaseous fuel which is likewise to be combusted. For this purpose, the fuel is fed to an annular duct 5.1.2 in a fuel feed and discharge appliance 5, in order to be evaporated in a heated cylinder chamber of an evaporator tube 2. This evaporation is achieved by generating a thin film 6 of the liquid fuel, preferably a thin film which is 0.2–0.5 mm thick, on the inner wall of the externally heated evaporator tube 2, by making the liquid fuel run over a tube edge or shoulder 2.2. This evaporated liquid fuel is mixed with a flushing gas, either steam or an inert gas which is fed from the other side of the evaporator tube 2, thus producing a fuel gas which is as homogenous as possible and the properties of which, with regard to the burner, correspond to the gaseous fuel which can likewise be combusted. This gas mixture is accumulated in an accumulator dome 5.2 and fed to the burner as a gas through a discharge line 5.3, which can be used to set further burner characteristics.

The processing device comprises a fuel pre-evaporator 1, which has an evaporator tube 2, which is made of a material with good thermal conductivity, preferably copper, and interacts with a heating device 3, essentially forming a heat exchanger. This heating device may be a jacket tube which surrounds the evaporator tube 2 and to which hot steam is fed, so that the temperature on the inside 2.1 of the evaporator tube 2 is 150–350° C., so that the film 6 of fuel can evaporate. This hot steam can be branched off from the steam circuit of a connected steam turbine. However, it is also possible to use hot exhaust gases from the gas turbine for heating purposes. At one end, this evaporator tube 2 has a feed device 4 for a flushing gas, and at its other end it has a fuel feed and discharge device 5. The feed device 4 for a flushing gas preferably has a mixer body 4.1, which protrudes into the evaporator tube 2 and improves the mixing of the flushing gas with the fuel vapor, i.e. results in a more homogenous fuel gas. To improve the mixing further, elements which increase the turbulence of the flow, such as vanes or prongs, may be arranged on the mixer body 4.1. The feed device 4 for a flushing gas also has a flushing-gas tube 4.2, which opens essentially tangentially into the feed device 4 and thus into the interior of the evaporator tube 2. The gas path produced in this way can still be influenced in a specific manner, on the one hand by the above-mentioned mixer body 4.1, or by a particular design of the inlet end of the flushing-gas tube 4.2, with the result that an essentially spiral-helical gas path is produced. The end of the flushing-gas tube 4.2 may be of nozzle-shaped design, in order further to improve the mixing of flushing gas and fuel. A fuel feed and discharge appliance 5 is arranged at the other end of the evaporator tube 2, in the region which is immediately adjacent to the evaporator tube 2. This appliance contains a liquid-fuel feed device 5.1, which finely divides the liquid fuel in the evaporator tube 2, and, next to this device 5.1, an accumulator dome 5.2 with a connected discharge line 5.3, in order to feed the fuel vapor/flushing gas mixture to the burner. Other adjustment members for optimally controlling the gas may also be provided in this discharge line. In the liquid-fuel feed device 5.1, a feed tube 5.1.1 is provided, which opens into an annular duct 5.1.2 of the liquid-fuel feed device 5.1, which annular duct contains at least one fuel injection opening 5.1.3 which opens tangentially into the evaporator tube 2 and is directed towards a shoulder 2.2 of the evaporator tube 2. Preferably, however, a plurality of fuel injection openings 5.1.3, preferably four, may be provided. In the present embodiment, the shoulder 2.2 of the evaporator tube 2 is formed by the end side of the evaporator tube, but it may also be realized as an independent element. In this case, the inner edge of the shoulder 2.2 forms a film run-off edge 2.3, via which the liquid fuel runs into the evaporator tube 2, becoming finely distributed in the process and thus forming a thin film, preferably of 0.2–0.5 mm thickness, on the inner wall 2.1 of the said evaporator tube. This film 6 of fuel evaporates on the heated inner wall 2.1 and is mixed with the flushing gas and accumulated in the accumulator dome 5.2 in order to be conveyed to the burner.

Obviously numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A method for feeding liquid fuels, gaseous fuels, or both in a gas turbine, wherein the gas turbine includes a burner, the method comprising the steps of:
    evaporating liquid fuel in a liquid fuel pre-evaporator;
    feeding evaporated liquid fuel along the same feed path to the burner of the gas turbine as the gaseous fuel;
    wherein said evaporating step comprises
        producing a thin film of fuel in the pre-evaporator;
        evaporating the thin film of fuel on a heated wall of the pre-evaporator to form the fuel vapor;
        mixing intimately the fuel vapor with a flushing gas; and
    wherein said feeding step comprises feeding the mixture of flushing gas and fuel vapor to the burner.

2. A method for feeding liquid fuels, gaseous fuels, or both in a gas turbine, wherein the gas turbine includes a burner, the method comprising the steps of:
    evaporating liquid fuel in a liquid fuel pre-evaporator;
    feeding evaporated liquid fuel along the same feed path to the burner of the gas turbine as the gaseous fuel;
    wherein the evaporating step comprises
        selecting the type, quantity, and temperature of a flushing gas for mixture with evaporated liquid fuel so that the same volumetric calorific value and a corresponding density are produced for the liquid fuel as for the gaseous fuel which is to be combusted.

3. The method in accordance with claim 1, wherein the flushing gas is steam.

4. The method in accordance with claim 1, wherein the flushing gas is an inert gas.

* * * * *